United States Patent
Yang et al.

(10) Patent No.: US 11,016,236 B2
(45) Date of Patent: May 25, 2021

(54) DISPLAY BACKLIGHT MODULE INCLUDING LIGHT GUIDE PLATE HAVING BOTTOM SURFACE WITH GROOVE PROXIMATE LEDS

(71) Applicant: Xiamen Tianma Micro-Electronics Co.,Ltd., Xiamen (CN)

(72) Inventors: Quande Yang, Xiamen (CN); Dawei Jiang, Xiamen (CN); Binghuang Zhang, Xiamen (CN); Ya Hui, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/720,871

(22) Filed: Dec. 19, 2019

(65) Prior Publication Data
US 2021/0096290 A1 Apr. 1, 2021

(30) Foreign Application Priority Data
Sep. 29, 2019 (CN) .......................... 201910931421.9

(51) Int. Cl.
*G02B 6/00* (2006.01)
*F21V 8/00* (2006.01)
*G09G 3/32* (2016.01)

(52) U.S. Cl.
CPC ......... *G02B 6/0038* (2013.01); *G02B 6/0051* (2013.01); *G02B 6/0053* (2013.01); *G02B 6/0055* (2013.01); *G09G 3/32* (2013.01)

(58) Field of Classification Search
CPC .. G02B 6/0011; G02B 6/0033; G02B 6/0035; G02B 6/0036; G02B 6/0038;
(Continued)

(56) References Cited

U.S. PATENT DOCUMENTS

| 7,014,351 B2* | 3/2006 | Leu | ....................... G02B 6/0043 362/619 |
| 7,473,022 B2* | 1/2009 | Yoo | ....................... G02B 6/0021 362/621 |

(Continued)

FOREIGN PATENT DOCUMENTS

| CN | 102588851 A | 7/2012 |
| CN | 106526963 A | 3/2017 |
| CN | 108196336 A | 6/2018 |

*Primary Examiner* — Ismael Negron
(74) *Attorney, Agent, or Firm* — Anova Law Group PLLC

(57) ABSTRACT

A backlight module includes a housing including a bottom plate and side plates, forming a receiving cavity; a backlight source received in the receiving cavity, and including a plurality of LED lights each having a light-emitting center portion for projecting light in a first direction; and a light guide plate received in the receiving cavity, and including a light receiving edge surface facing the backlight source and extending in a second direction, a light-exiting top surface, and a bottom surface. First regions are included on a portion of the bottom surface of the light guide plate close to the light receiving edge surface in one-to-one correspondence to the light-emitting center portion of each LED light of the plurality of LED lights, each of the plurality of first regions having at least one first groove arranged in the first direction and extending in the second direction.

13 Claims, 10 Drawing Sheets

(58) Field of Classification Search
CPC ........... G02F 1/133615; F21V 2200/20; F21Y 2115/10; F21K 9/61
See application file for complete search history.

(56) References Cited

U.S. PATENT DOCUMENTS

| | | | | |
|---|---|---|---|---|
| 7,641,376 B2* | 1/2010 | Sakai | .................... | G02B 6/0055 |
| | | | | 362/623 |
| 7,841,758 B2* | 11/2010 | Lai | ......................... | G02B 6/005 |
| | | | | 362/606 |
| 8,167,474 B2* | 5/2012 | Tanoue | ................ | G02B 6/0021 |
| | | | | 362/607 |
| 8,231,258 B2* | 7/2012 | Kim | ..................... | G02B 6/0088 |
| | | | | 362/609 |
| 9,720,165 B2* | 8/2017 | Park | ....................... | G02B 6/0083 |
| 10,353,244 B2* | 7/2019 | Ou | ........................ | G02B 6/0088 |
| 2009/0052204 A1* | 2/2009 | Kawashima | ......... | G02B 6/0073 |
| | | | | 362/555 |
| 2009/0323372 A1* | 12/2009 | Kurihara | ................ | G02B 6/002 |
| | | | | 362/620 |
| 2012/0314445 A1* | 12/2012 | Masuda | ............... | G02B 6/0008 |
| | | | | 362/581 |
| 2015/0109816 A1* | 4/2015 | Yagi | ..................... | G02B 6/0031 |
| | | | | 362/606 |
| 2020/0073040 A1* | 3/2020 | Lee | ....................... | G02B 6/0073 |

\* cited by examiner

DISPLAY BACKLIGHT MODULE INCLUDING LIGHT GUIDE PLATE HAVING BOTTOM SURFACE WITH GROOVE PROXIMATE LEDS

CROSS-REFERENCES TO RELATED APPLICATIONS

This application claims priority of Chinese Patent Application No. 201910931421.9, filed on Sep. 29, 2019, the entire content of which is hereby incorporated by reference.

FIELD OF THE DISCLOSURE

The present disclosure generally relates to the field of display technologies and, more particularly, relates to a backlight module and a display device.

BACKGROUND

A backlight module for a display panel usually includes a side-in type backlight source disposed at a side of a light guide plate. After entering the light guide plate, light emitted by the side-in type backlight source may diffuse based on mesh points disposed on the light guide plate, such that the light is evenly emitted from a light-exiting surface of the light guide plate. Accordingly, a point light source may be converted into a surface light source.

As a frame of a display device becomes narrower, a problem of before-light visual yellowing of a side-in type backlight source may become serious. As such, it is urgent to provide a narrow-frame backlight module capable of solving the problem of before-light visual yellowing of a side-in backlight source.

The disclosed methods and structures are directed to solve one or more problems set forth above and other problems in the art.

SUMMARY

One aspect of the present disclosure includes a backlight module. The backlight module includes: a housing including a bottom plate and side plates, forming a receiving cavity; a backlight source received in the receiving cavity, and including a plurality of LED lights each having a light-emitting center portion for projecting light in a first direction; and a light guide plate received in the receiving cavity, and including a light receiving edge surface facing the backlight source and extending in a second direction, a light-exiting top surface, and a bottom surface. First regions are included on a portion of the bottom surface of the light guide plate close to the light receiving edge surface in one-to-one correspondence to the light-emitting center portion of each LED light of the plurality of LED lights, each of the plurality of first regions having at least one first groove arranged in the first direction and extending in the second direction.

Another aspect of the present disclosure includes a display device. The display device includes a backlight module. The backlight module includes: a housing including a bottom plate and side plates, forming a receiving cavity; a backlight source received in the receiving cavity, and including a plurality of LED lights each having a light-emitting center portion for projecting light in a first direction; and a light guide plate received in the receiving cavity, and including a light receiving edge surface facing the backlight source and extending in a second direction, a light-exiting top surface, and a bottom surface. First regions are included on a portion of the bottom surface of the light guide plate close to the light receiving edge surface in one-to-one correspondence to the light-emitting center portion of each LED light of the plurality of LED lights, each of the plurality of first regions having at least one first groove arranged in the first direction and extending in the second direction. A display panel is disposed on the light-exiting top surface of the backlight module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure more clear and explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

The present disclosure provides a backlight module and a display device. Embodiments of the backlight module and the display device provided by the present disclosure are described below in detail.

Figure 1:
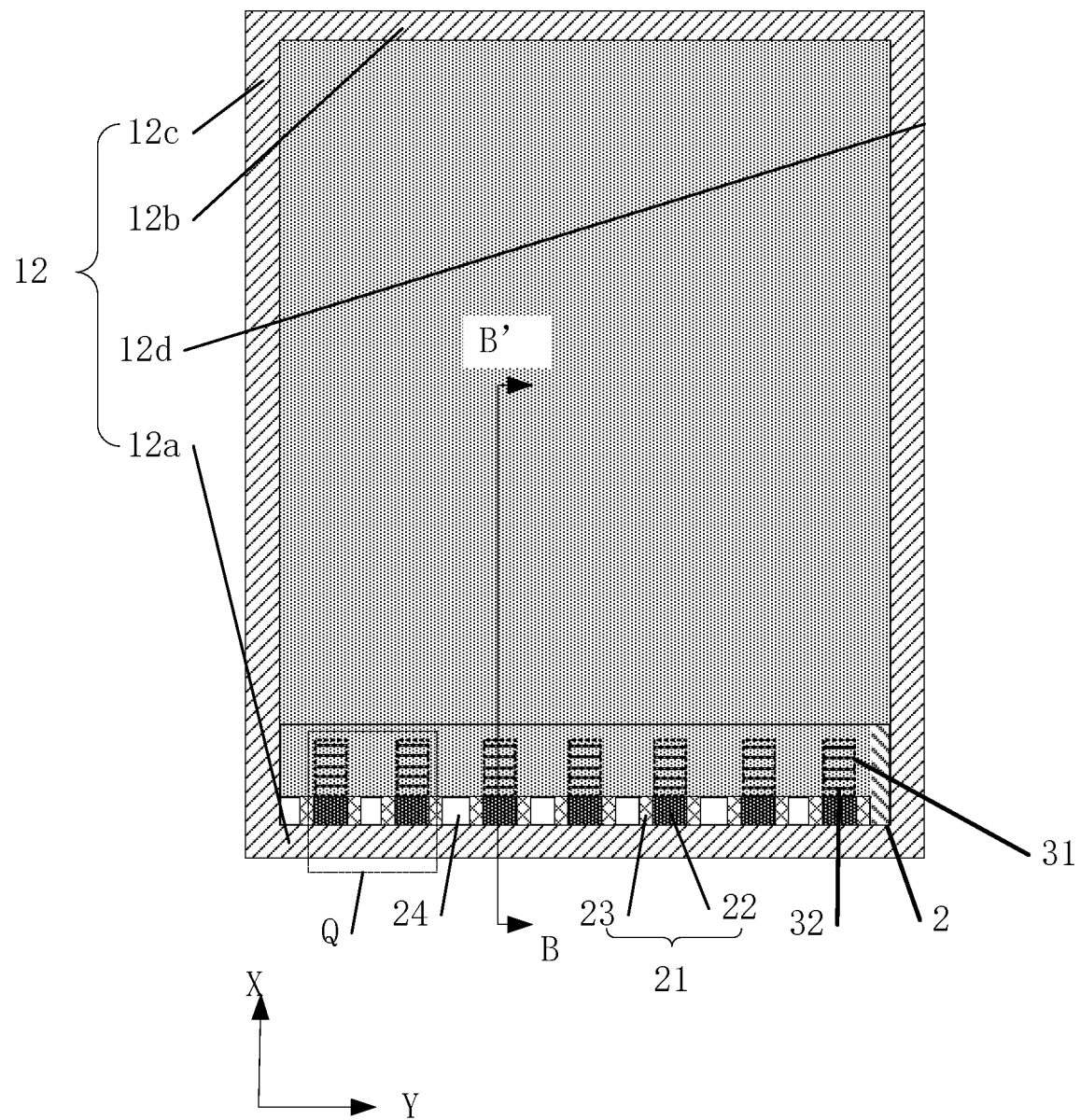
FIG. 1 illustrates a planar structural schematic of a backlight module consistent with the disclosed embodiments of the present disclosure.
Figure 2:
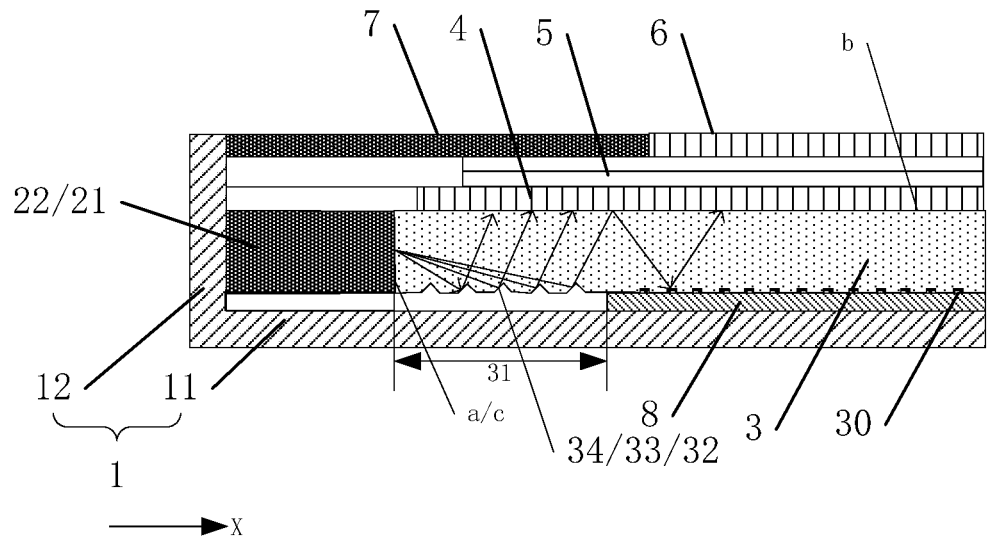
FIG. 2 illustrates a cross-sectional view at cross-section B-B' in FIG. 1, consistent with the disclosed embodiments of the present disclosure.
Figure 3:
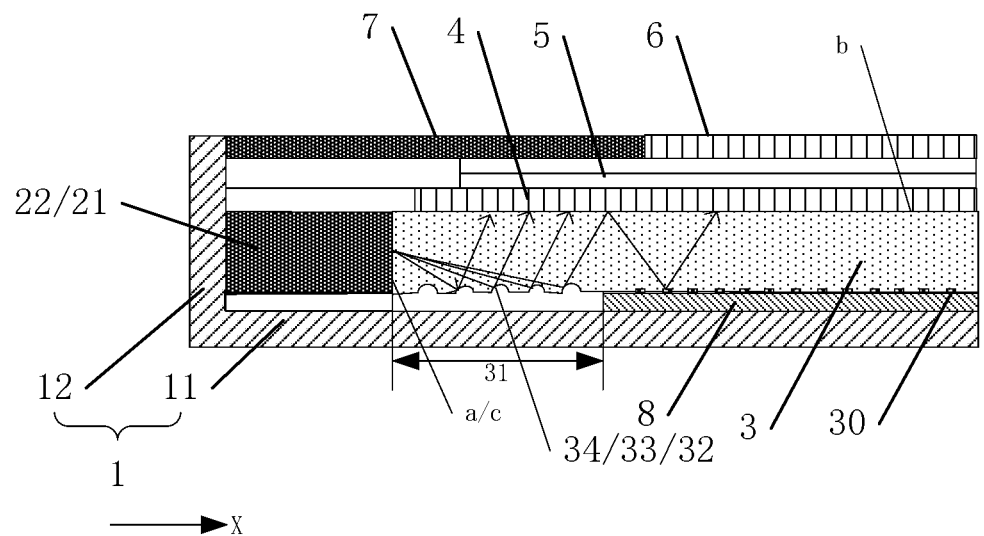
FIG. 3 illustrates another cross-sectional view at cross-section B-B' in FIG. 1, consistent with the disclosed embodiments of the present disclosure.
Figure 4:
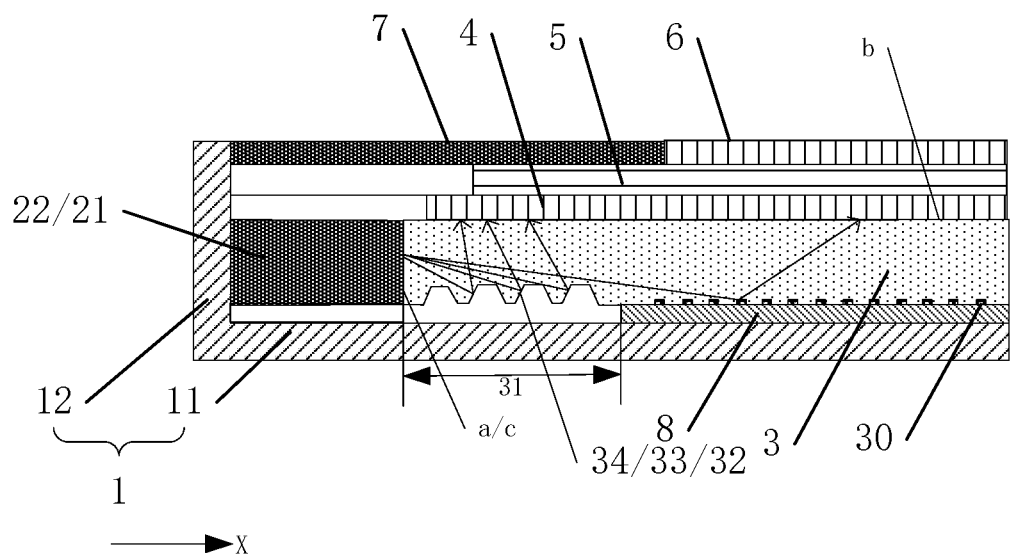
FIG. 4 illustrates another cross-sectional view at cross-section B-B' in FIG. 1, consistent with the disclosed embodiments of the present disclosure.

FIG. 1 illustrates a planar structural schematic of a backlight module consistent with the disclosed embodiments of the present disclosure. FIG. 2 illustrates a cross-sectional view at cross-section B-B' in FIG. 1. FIG. 3 illustrates another cross-sectional view at the cross-section B-B' in FIG. 1. FIG. 4 illustrates another cross-sectional view at the cross-section B-B' in FIG. 1.

As shown in FIG. 1 and FIG. 2, the backlight module 100 includes a housing 1, a backlight source 2 and a light guide plate 3. The housing 1 includes a bottom plate 11 and side plates 12. The side plates 12 and the bottom plate 11 form a receiving cavity for accommodating the backlight source 2 and the light guide plate 3. The backlight source 2 and the light guide plate 3 are disposed in a first direction X. A light-exiting surface a of the backlight source 2 intersects with a light exiting surface b of the light guide plate 3. In one embodiment, the light exiting surface b of the light guide plate 3 may be referred to as a light-exiting top surface of the light guide plate. The backlight source 2 includes a plurality of LED lights 21 arranged in a second direction Y, and each of the LED lights 21 includes a light-emitting center portion 22 in the middle of the corresponding LED light. The light-emitting center portion 22 has a light-exiting side c for projecting light in the first direction. The first direction X intersects with the second direction Y.

The light guide plate 3 includes a light receiving edge surface, facing the backlight source 2 and extending in the second direction Y, and a surface opposite to the light exiting surface b. A plurality of first regions 31 are included on a portion of the bottom surface of the light guide plate 3 close to the light receiving edge surface in one-to-one correspondence to the light-emitting center portions 22. An orthographic projection of the first region 31 on a plane of the bottom plate 11 abuts on an orthographic projection of a corresponding light-emitting center portion 22 on the plane of the bottom plate 11. In the first region 31, a side close to the bottom plate 11 includes at least one first groove 32 arranged in the first direction X and extending in the second direction Y.

It may be understood that the light exiting surface a of the backlight source 2 intersects with the light exiting surface b of the light guide plate 3. That is, the backlight source 2 in the present disclosure is a side-in type backlight source.

As shown in FIG. 2, the backlight module 2 also includes other film layers, such as a lower diffusion sheet 4, a brightness enhancement film 5 and an upper diffusion sheet 6 that are stacked in sequence on a side of the light-exiting surface b of the light guide plate 3. The backlight module 2 also includes a reflection sheet 8 disposed on a side of the light guide plate 3 away from the lower diffusion sheet 4. A light shielding film 7 is disposed at a position corresponding to a non-display area of the backlight module 100. The light shielding film 7 is located on a side of the LED lights 21 away from the bottom plate 11. Mesh points 30 are disposed on the light guide plate 3.

Each of the LED lights 21 also includes edge portions 23 at two sides of the light-emitting center portion 22. According to characteristics of the LED light itself, intensity of light generated by the light-emitting center portion 22 is greater than light intensity of the edge portions 23. A first interval 24 is located between two adjacent LED lights 21. The present disclosure does not specifically limit the first interval 24.

FIG. 2 shows that the first grooves 32 have a triangle shape in a cross section in a direction perpendicular to the light guide plate 3. The present disclosure does not specifically limit shapes of the first grooves. Also, the present disclosure does not specifically limit the number of the first grooves 32.

It may be seen from FIG. 2 that the first regions 31 are opposite to the light-emitting center portions 22, and light emitted from the light-emitting center portions 22 may enter the first regions 31.

In a conventional technology, the LED light 21 of the backlight source 2 may be made by covering a blue LED light with a yellow fluorescent powder coating. When a chip of the blue LED light emits blue light, part of the blue light may be converted into yellow light. But, due to light-emitting characteristics of the LED light itself, intensity of the blue light emitted from the light-emitting center portion 22 in the middle of the LED light is greater than the intensity of the blue light at the edge portions 23 at two sides of the LED light. After the blue light is converted into the yellow light, a position corresponding to a light-emitting center portion 22 of each LED light is more bluish than the edge portions 23 at the two sides of the LED light. That is, the light emitted from the light-emitting center portion 22 is bluish white light. Before the bluish white light reaches the mesh points 30, the bluish white light may propagate based on total reflection, and diffuse in the first direction X. Less blue light may be trapped at a front end of the light guide plate 3 (i.e., the first region 31) corresponding to the light-emitting center portion 22. Light at the front end of the light guide plate 3 corresponding to the edge portions 23 is yellowish white light, and the yellowish white light mainly propagates in the second direction Y. Accordingly, most of the energy of the yellowish white light is trapped at the front end of the light guide plate 3, that is, trapped in a position of the light guide plate near the backlight 2, and may not reach positions of the mesh points 30. As such, a yellowing phenomenon may occur at a position between two adjacent LED lights 21 and close to the light guide plate 3, and the yellowing phenomenon may be referred to as before-light visual yellowing.

As may be seen from FIG. 2, when light emitted from the light-emitting center portion 22 passes through the first region 31, since at least one first groove 32 arranged in the first direction X and extending in the second direction Y is disposed in the first region 31, the light may be diffusely reflected by the first groove 32. Accordingly, a part of the bluish white light may be trapped in the first region 31, and mixed with the yellowish light emitted from the edge portions 23 at two sides of the light-emitting center portion 22. As such, white light with mixed blue light and yellow light may be formed, and thus the problem of before-light visual yellowing may be weakened.

It should be noted that, since FIG. 2 is a cross-sectional view, light lines in FIG. 2 are only a schematic of the light at the cross section. The bluish white light may be diffusely reflected on a rough surface at the first groove 32, such that a part of the bluish white light may be trapped in the first region 31.

Compared with a conventional technology, embodiments of the present disclosure may have at least following beneficial effects:

In the present disclosure, a backlight source 2 includes a plurality of LED lights 21 arranged in a second direction Y. Each of the LED lights 21 includes a light-emitting center portion 22 in the middle, and the light-emitting center portion 22 has a light-exiting side c. The light-exiting side c is opposite to a light guide plate 3, and a first direction X intersects with the second direction Y. A side of the light guide plate 3 close to the backlight source 2 includes a plurality of first regions 31. The first regions 31 are in one-to-one correspondence to the light-emitting center portions 22. An orthographic projection of one first regions 31 on a plane of a bottom plate 11 abuts on an orthographic projection of a corresponding light-emitting center portion 22 on the plane of the bottom plate 11. In the present disclosure, first grooves 32 arranged in the first direction X and extending in the second direction Y are disposed in the first regions 31. When light emitted from the light-emitting center portions 22 passes through the first regions 31, diffuse reflection may occur at the first grooves 32. As such, bluish white light emitted from the light-emitting center portions 22 may be trapped in the first regions 31, and mixed with yellowish light emitted from the edge portions 23 at two sides of the light-emitting center portions 22. Accordingly, white light with mixed blue light and yellow light may be formed, and thus the problem of before-light visual yellowing may be weakened.

FIG. 3 illustrates another cross-sectional view at cross-section B-B' in FIG. 1. As shown in FIGS. 2 and 3, each of the first grooves 32 has a first cross section 33 in a direction perpendicular to the plane of the light guide plate 3. The first cross section 33 has a first side 34 along the first direction X, and the first side 34 may be zigzag-shaped or arc-shaped.

FIG. 2 shows that the first groove 32 includes a first cross section 33 in a direction perpendicular to the plane of the light guide plate 3. The first cross section 33 includes a first side 34 in the first direction X, and the first side 34 is zigzag-shaped.

FIG. 3 shows that the first groove 32 includes a first cross section 33 in a direction perpendicular to the plane of the light guide plate 3. The first cross section 33 includes a first side 34 in the first direction X, and the first side 34 is arc-shaped.

In FIG. 2 and FIG. 3, the first regions 31 are in one-to-one correspondence to the light-emitting center portions 22. An orthographic projection of one first area 31 on the plane of the bottom plate 11 abuts on an orthographic projection of a corresponding light-emitting center portion 22 on the plane of the bottom plate 11. The first regions 31 are disposed with first grooves 32 arranged in the first direction X and extending in the second direction Y. Light emitted from the light-emitting center portions 22 may pass through the first regions 31. When the first side 34 is zigzag-shaped or arc-shaped, in the first direction X, when parallel blueish white light reaches the first side 34, contact points may not be in a same plane, such that the parallel blueish light may be diffusely reflected in all directions. Accordingly, the blueish white light emitted from the light-emitting center portions 22 may be trapped in the first regions 31, and may be mixed with yellowish light emitted from the edge portions 23 at two sides of the light-emitting center portions 22. Thus, white light with mixed blue light and yellow light may be formed, and the problem of before-light visual yellowing may be weakened.

FIG. 4 illustrates another cross-sectional view at cross-section B-B' in FIG. 1. As shown in FIGS. 1, 2 and 4, the side plates 12 include a first side plate 12a, a second side plate 12b, a third side plate 12c and a fourth side plate 12d. The first side plate 12a and the second side plate 12b are located opposite to each other at two sides of the bottom panel 11 in the first direction X. The third side plate 12c and the fourth side plate 12d are located at two opposite sides of the bottom plate in the second direction Y. The bottom plate, the first side plate 12a, the second side plate 12b, the third side plate 12c and the fourth side plate 12d form the receiving cavity. The backlight source 2 is located between the light guide plate 3 and the first side plate 12a.

An orthographic projection of the first groove 32 on a plane of the third side plate 12c may be trapezoidal or triangular. In FIG. 2, an orthographic projection of the first groove 32 on a plane of the third side plate 12c is a triangle. In FIG. 4, an orthographic projection of the first groove 32 on the plane of the third side plate 12c is a trapezoid.

In FIG. 2 and FIG. 4, the first regions 31 are in one-to-one correspondence to the light-emitting center portions 22. An orthographic projection of one first region 31 on the plane of the bottom plate 11 abuts on an orthographic projection of a corresponding light-emitting center portion 22 on the plane of the bottom plate 11. The first regions 31 are disposed with first grooves 32 arranged in the first direction X and extending in the second direction Y. When light emitted from the light-emitting center portions 22 passes through the first regions 31, diffuse reflection may occur at the first sides 34 of the first grooves 32. The first groove 32 has a first cross-section 33 in a direction perpendicular to the plane of the light guide plate 3. The first cross-section 33 includes a first side 34 along the first direction X, and the first side 34 is zigzag-shaped. Further, an orthographic projection of the first groove 32 on a plane of the third side plate 12c is trapezoidal or triangular.

Since the orthographic projection of the first groove 32 on the plane of the third side plate 12c is trapezoidal or triangular, in the first direction X, when the parallel blueish white light reaches the first side 34, contact points may not be in a same plane, and thus the light may be diffusely reflected in all directions. Accordingly, the blueish white light emitted from the light-emitting center portions 22 may be trapped in the first regions 31, and may be mixed with the yellowish light emitted from the edge portions 23 at two sides of the light-emitting center portions 22. Thus, white light with mixed blue light and yellow light may be formed, and the problem of before-light visual yellowing may be weakened.

Figure 5:
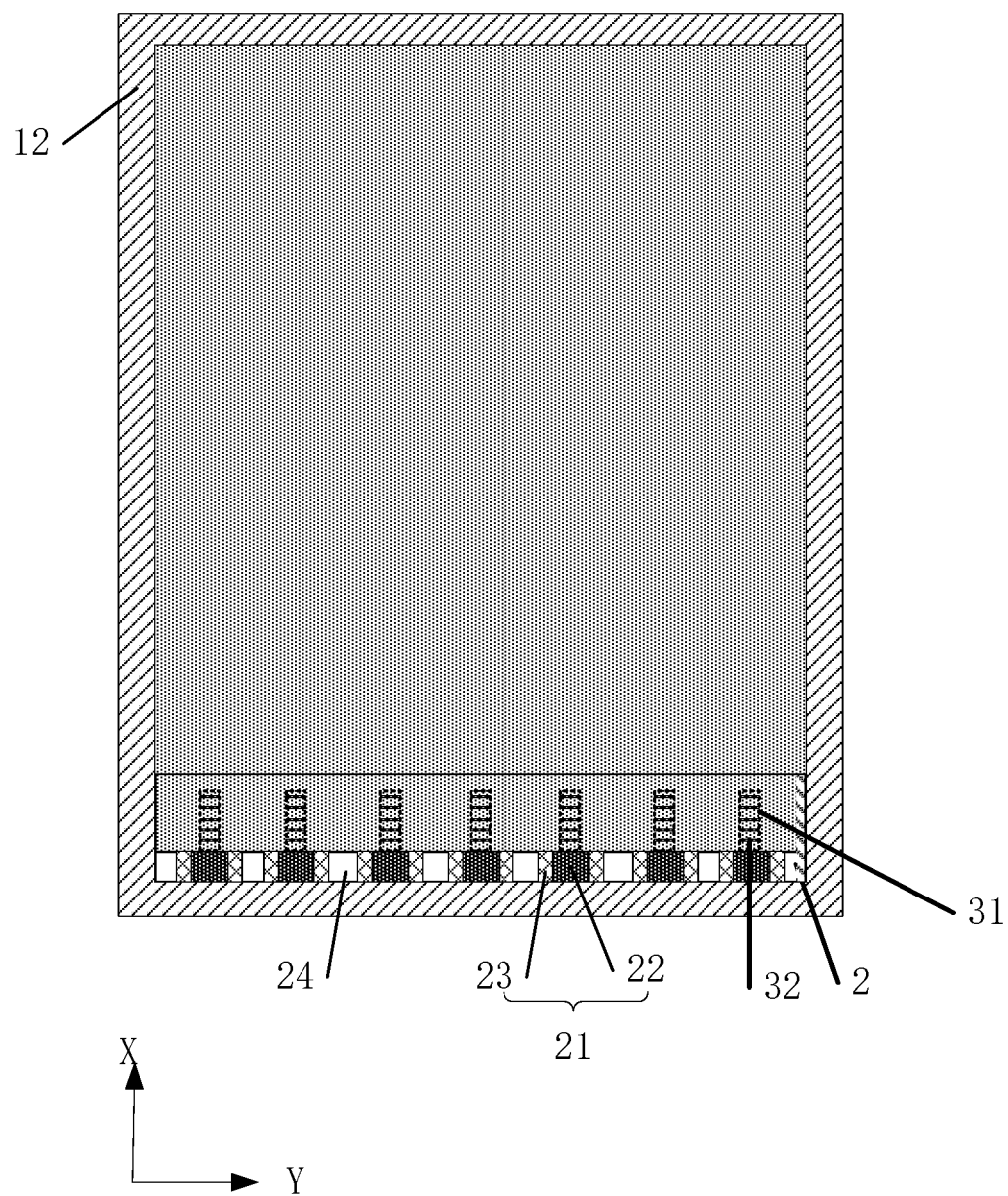
FIG. 5 illustrates a planar structural schematic of another backlight module consistent with the disclosed embodiments of the present disclosure.

FIG. 5 illustrates a planar structural schematic of another backlight module consistent with the disclosed embodiments of the present disclosure. In the second direction Y, a length of the first regions 31 may be less than or equal to a length of the light-emitting center portions 22. In FIG. 1, in the second direction Y, the length of the first regions 31 is equal to the length of the light-emitting center portions 22. In FIG. 5, in the second direction Y, the length of the first regions 31 is smaller than the length of the light-emitting center portions 22.

In the present disclosure, a backlight source 2 includes a plurality of LED lights 21 arranged in a second direction Y. Each of the LED lights 21 includes a light-emitting center portion 22 in the middle, and the light-emitting center portion 22 has a light-exiting side c. The light-exiting side c is opposite to a light guide plate 3, and a first direction X intersects with the second direction Y. A side of the light guide plate 3 close to the backlight source 2 includes a plurality of first regions 31. The first regions 31 are in one-to-one correspondence to the light-emitting center portions 22. An orthographic projection of one first regions 31 on a plane of a bottom plate 11 abuts on an orthographic projection of a corresponding light-emitting center portion 22 on the plane of the bottom plate 11. In the present disclosure, first grooves 32 arranged in the first direction X and extending in the second direction Y are disposed in the first regions 31. When light emitted from the light-emitting center portions 22 passes through the first regions 31, diffuse reflection may occur at the first grooves 32. As such, bluish white light emitted from the light-emitting center portions 22 may be trapped in the first regions 31, and mixed with yellowish light emitted from the edge portions 23 at two sides of the light-emitting center portions 22. Accordingly, white light with mixed blue light and yellow light may be formed, and thus the problem of before-light visual yellowing may be weakened.

It may be understood that an effect of weakening the problem of before-light visual yellowing when the length of the first regions 31 in the second direction Y is equal to the length of the light-emitting center portions 22 may be better than an effect of weakening the problem of before-light visual yellowing when the length of the first regions 31 is smaller than the length of the light-emitting center portions 22. That is, when the length of the first regions 31 in the second direction Y is closer to the length of the light-emitting center portions 22, more light in the bluish white light emitted by the light-emitting center portions 22 may be trapped in the first regions 31, and mixed with the yellowish light emitted from the edge portions 23 at two sides of the light-emitting center portions 22. Accordingly, white light with mixed blue light and yellow light may be formed, and the problem of before-light visual yellowing may be weakened.

Figure 6:
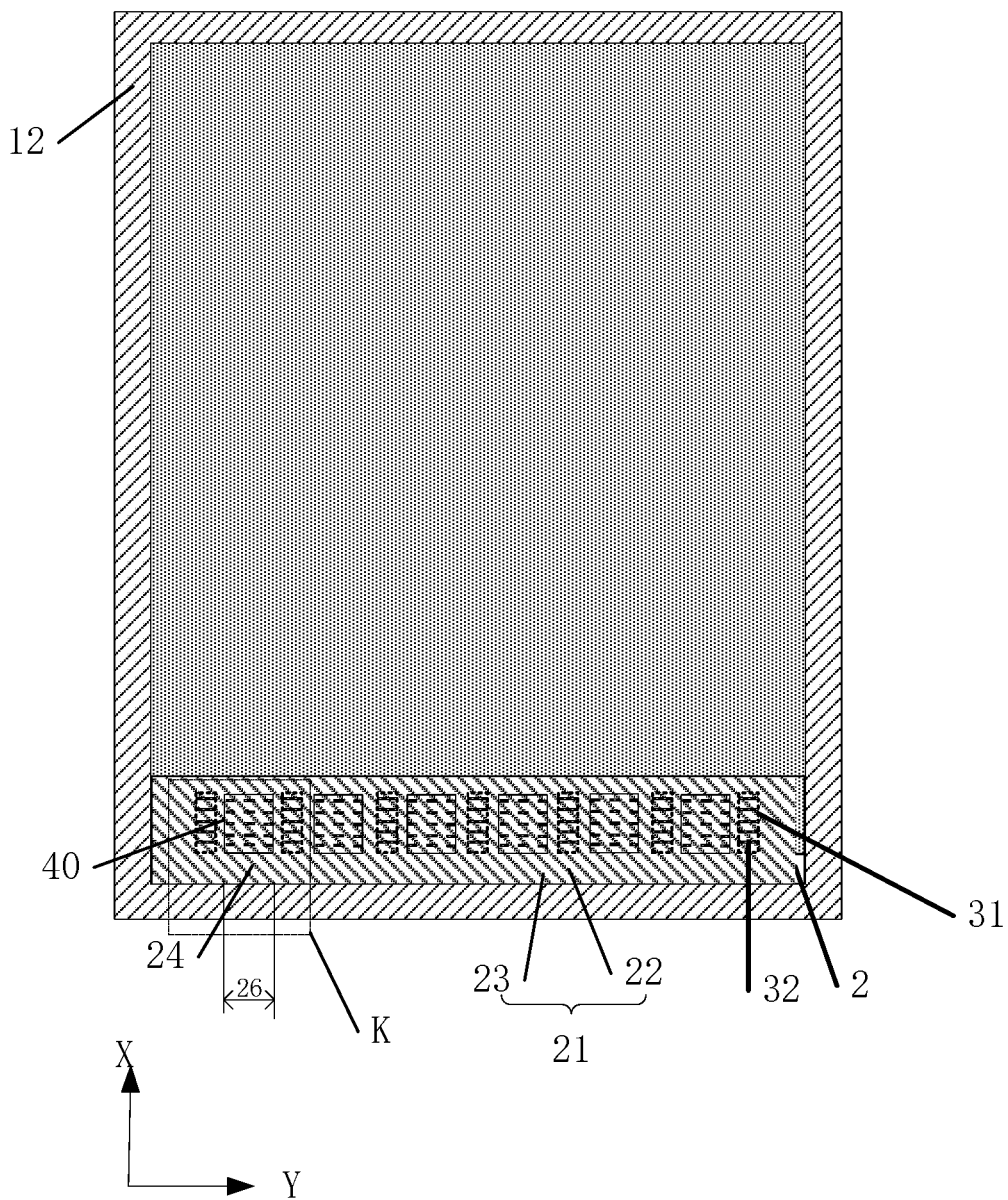
FIG. 6 illustrates a planar structural schematic of another backlight module consistent with the disclosed embodiments of the present disclosure.
Figure 7:
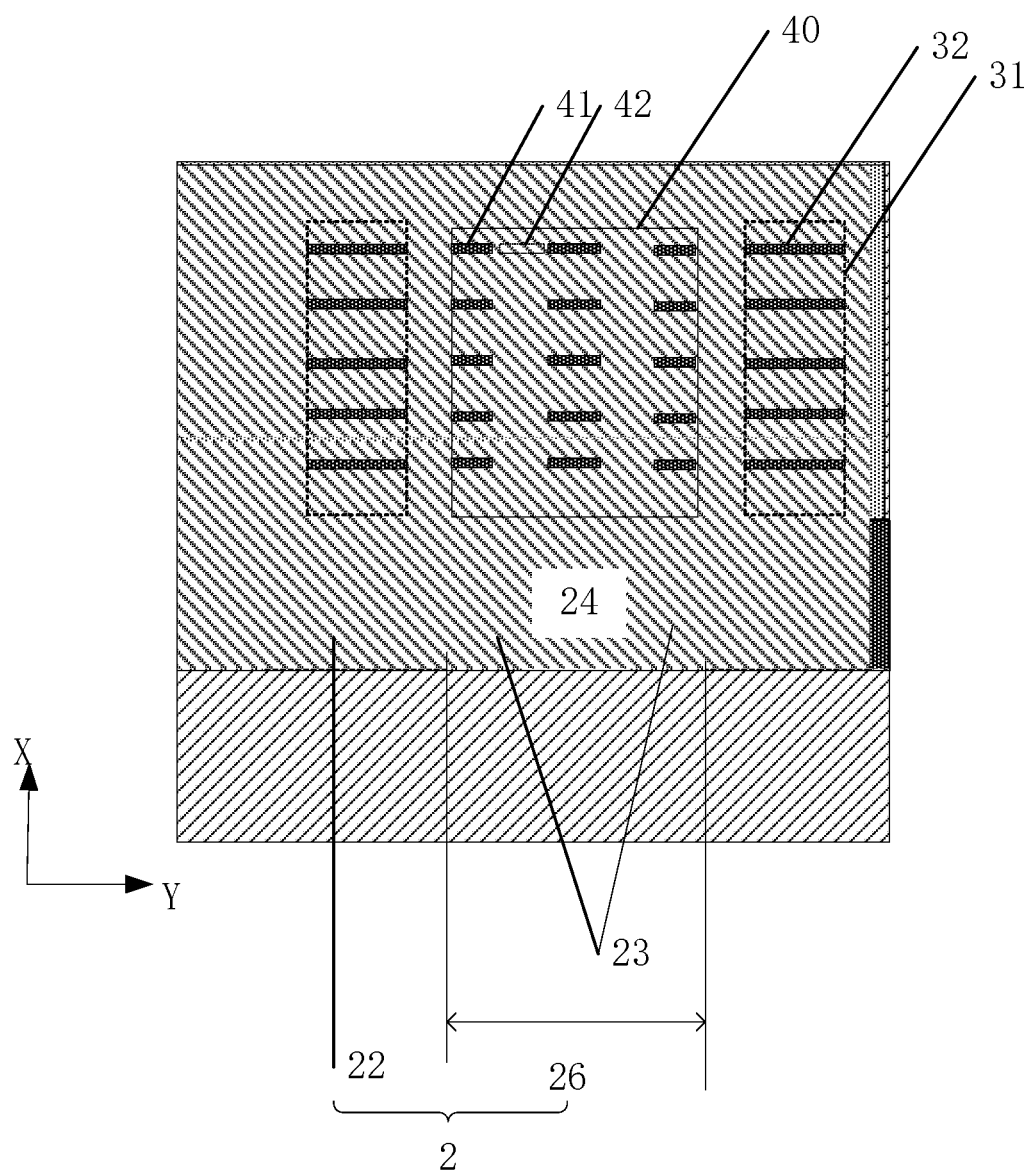
FIG. 7 illustrates a partially enlarged view of area K in FIG. 6, consistent with the disclosed embodiments of the present disclosure.

FIG. 6 illustrates a planar structural schematic of another backlight module consistent with the disclosed embodiments of the present disclosure. FIG. 7 illustrates a partially enlarged view of area K in FIG. 6. In FIG. 7, the backlight source 2 also includes an inter-light portion 26 between two adjacent light-emitting center portions 22. Each of the LED lights 21 also includes edge portions 23 at two sides of the light-emitting center portion 22 in the second direction Y. There is a first interval 24 between two adjacent LED lights 21, and the inter-light portion 26 includes edge portions 23 of two adjacent LED lights and a first interval 24.

In FIG. 6 and FIG. 7, a plurality of second regions 40 is included at a side of the light guide plate close to the backlight 2. E.g., second regions 40 may be included on another portion of the bottom surface of the light guide plate 3 close to the light receiving edge surface thereof. The second regions 40 are in one-to-one correspondence to the inter-light portion 26. An orthographic projection of one second region 40 on the plane of the bottom plate abuts on an orthographic projection of a corresponding inter-light portion 26 on the plane of the bottom plate. In the second region 40, a side close to the bottom plate includes at least one second groove 41 arranged in the first direction X and extending in the second direction Y. In the second direction Y, the second groove 41 is located between two adjacent first grooves 32. Each of the second grooves 41 includes a disconnection portion 42.

It may be understood that a structure of the second groove 41 may be same as or different from a structure of the first groove 32. Preferably, the second groove has a first cross section in a direction perpendicular to a plane of the light guide plate. The first cross section has a first side in the first direction, and the first side may be zigzag-shaped or arc-shaped. Preferably, an orthographic projection of the second groove in a plane of the third side plate is trapezoidal or triangular.

In one embodiment, when the light emitted from the light-emitting center portions 22 passes through the first regions 31, diffuse reflection may occur at the first grooves 32. Accordingly, the bluish white light emitted from the light-emitting center portions 22 may be trapped in the first regions 31, and mixed with yellowish light emitted from the edge portions 23 at two sides of the light-emitting center portions 22. Meanwhile, the second regions 40 are in one-to-one correspondence to the inter-light portions 26. An orthographic projection of one second region 40 on the plane of the bottom plate abuts an orthographic projection of a corresponding inter-light portion 26 on the plane of the bottom plate. In the second region 40, a side close to the bottom plate includes at least one second groove 41 arranged in the first direction X and extending in the second direction Y. In the second direction Y, the second groove 41 is located between two adjacent first grooves 32. Yellowish white light emitted by the edge portions 23 of the LED light 21 may be diffusely reflected by the second groove 41 at the second region 40, and further mixed with the light that is emitted from the light-emitting center portion 22 and diffused at the first region 31.

It may be understood that, when less yellowish white light between the light-emitting center portions 22 reaches the mesh points of the light guide plate 3, a problem of blackening between the light-emitting center portions 22 may occur. Intensity of light emitted from the edge portions 23 may be relatively weak. If yellowish white light emitted from the edge portion 23 is cut off, the problem of blackening between the light-emitting center portions 22 may occur. In the present disclosure, each of the second grooves 41 includes a disconnection portion 42. The disconnected portion 42 may prevent the yellowish white light emitted from the edge portions 23 from being cut off, and thus the problem of blackening between the light-emitting center portions 22 may be avoided.

As shown in FIG. 6 and FIG. 7, in the second direction Y, the second grooves 41 may be disposed in parallel with the first grooves 32.

It may be understood that, in one embodiment, when the light emitted from the light-emitting center portions 22 passes through the first regions 31, diffuse reflection may occur at the first grooves 32. Accordingly, the bluish white light emitted from the light-emitting center portions 22 may be trapped in the first regions 31, and mixed with yellowish light emitted from the edge portions 23 at two sides of the light-emitting center portions 22. Meanwhile, the second regions 40 are in one-to-one correspondence to the inter-light portions 26. An orthographic projection of one second region 40 on the plane of the bottom plate abuts on an orthographic projection of a corresponding inter-light portion 26 on the plane of the bottom plate. In the second region 40, a side close to the bottom plate includes at least one second groove 41 arranged in the first direction X and extending in the second direction Y. In the second direction Y, the second groove 41 is located between two adjacent first grooves 32. Yellowish white light emitted from the edge portions 23 of the LED lights 21 may be diffusely reflected by the second grooves 41 at the second regions 40, and further mixed with the light that is emitted from the light-emitting center portions 22 and diffused at the first regions 31. Each of the second grooves 41 includes a disconnection portion 42. The second grooves 41 are arranged in parallel with the first grooves 32, such that yellowish white light and yellowish blue light may be mixed, and the problem of before-light visual yellowing may be weakened.

Figure 8:
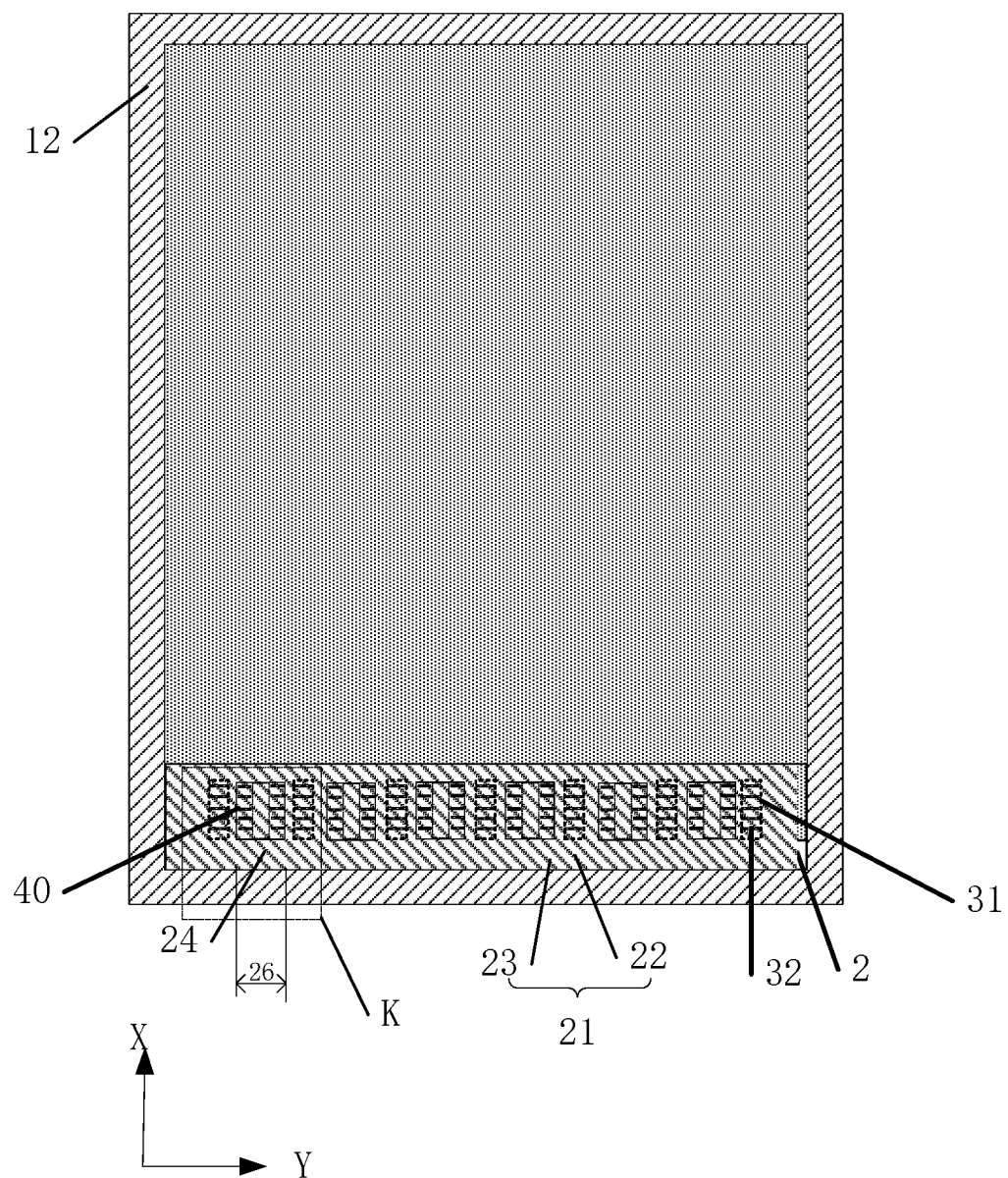
FIG. 8 illustrates a planar structural schematic of another backlight module consistent with the disclosed embodiments of the present disclosure.
Figure 9:
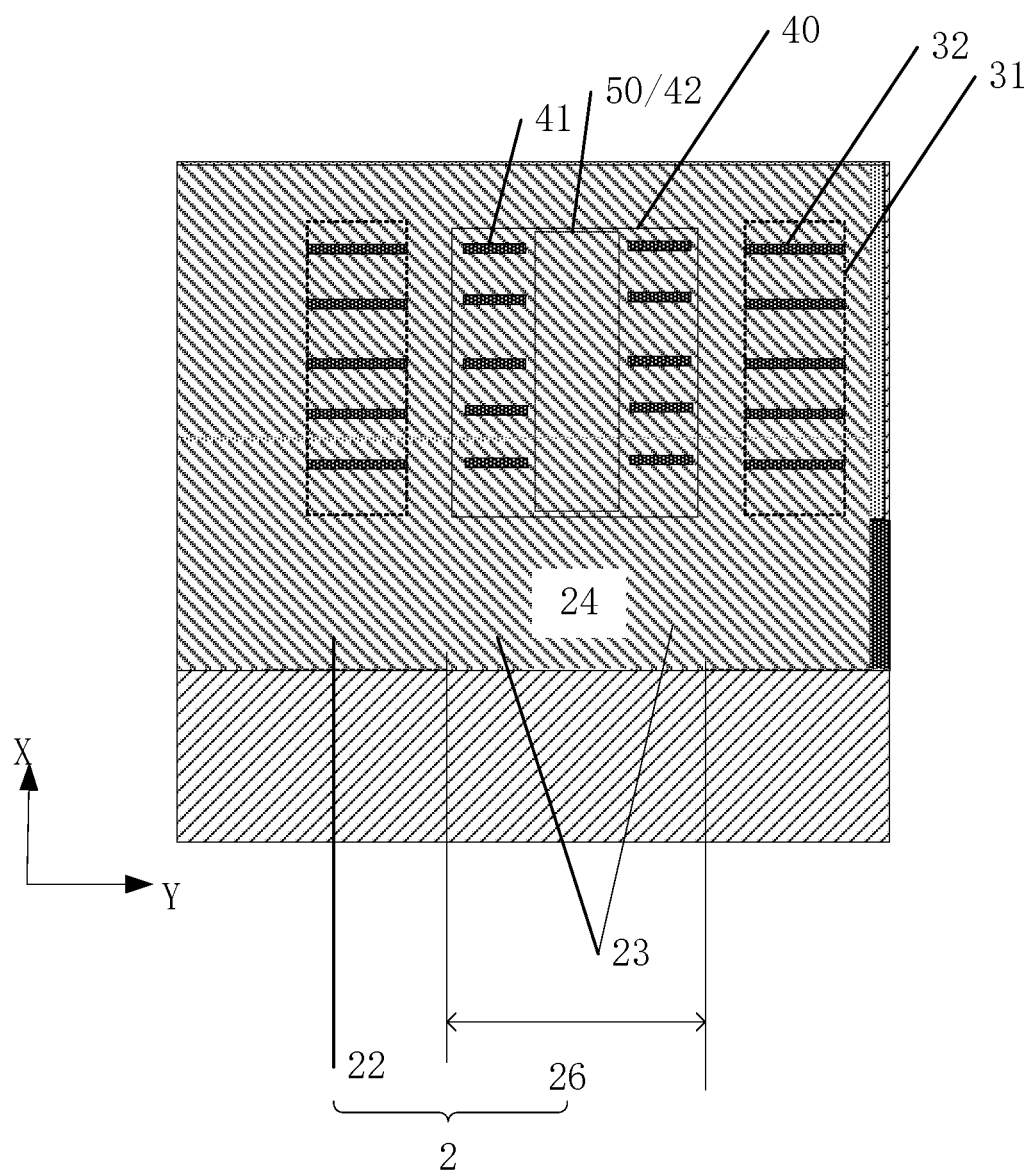
FIG. 9 illustrates a partially enlarged view of area P in FIG. 8, consistent with the disclosed embodiments of the present disclosure.

FIG. 8 illustrates a planar structural schematic of another backlight module consistent with the disclosed embodiments of the present disclosure. FIG. 9 illustrates a partially enlarged view of area P in FIG. 8. As shown in FIG. 8 and FIG. 9, a second region 40 includes a second sub-region 50. The second sub-regions 50 are in one-to-one correspondence to the first intervals 24. An orthographic projection of one second sub-region 50 at the plane of the bottom plate abuts on an orthographic projection of a corresponding first interval 24 at the plane of the bottom plate. The second sub-region 50 includes at least one disconnection portion 42.

Since intensity of light at a region corresponding to the first interval 24 between two adjacent LED lights 21 may be weak, the disconnected portion 42 is disposed at the second sub-area 50 corresponding to the first interval 24. Accordingly, mixed yellowish white light and yellowish blue light may pass through the second sub-region 50 and reach a region of the light guide plate disposed with the mesh points, that is, a side of the second sub-region 50 close to the second side plate.

In one embodiment, the first grooves 32 and the second grooves 41 are formed by laser scribing or collision point stacking. Process conditions for the laser scribing and the collision point stacking may be determined by referring to process conditions of a conventional technology, and structures of the first grooves 32 or the second grooves 41 illustrated in FIGS. 1 to 9 may be formed accordingly. The present disclosure does not limit the process conditions.

Figure 10:
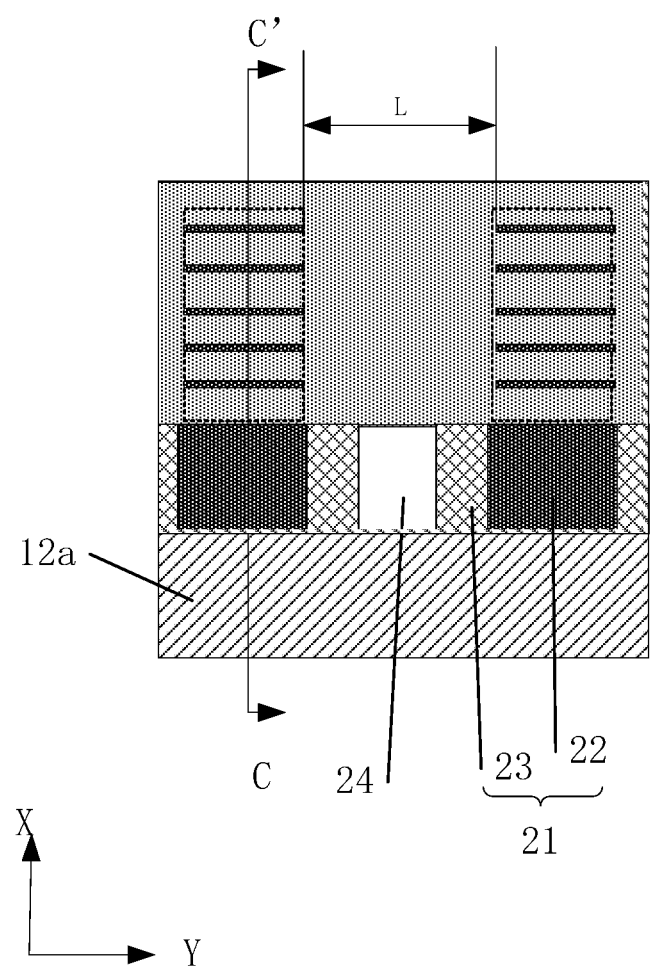
FIG. 10 illustrates a partially enlarged view of area Q in FIG. 1, consistent with the disclosed embodiments of the present disclosure.
Figure 11:
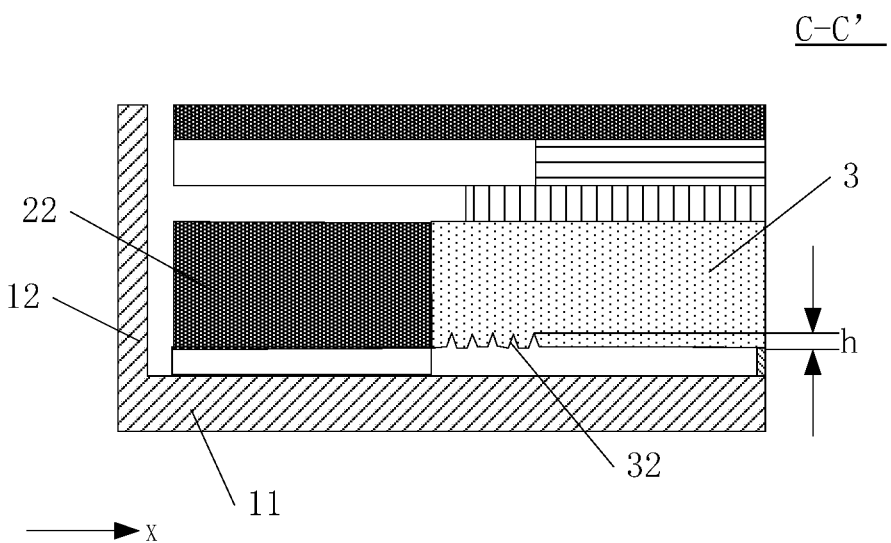
FIG. 11 illustrates a cross-sectional view at cross-section C-C' in FIG. 10, consistent with the disclosed embodiments of the present disclosure.

FIG. 10 illustrates a partially enlarged view of area Q in FIG. 1. FIG. 11 illustrates a cross-sectional view at cross-section C-C' in FIG. 10.

Referring to FIG. 11, in a direction perpendicular to a plane of the light guide plate 3, the first groove 32 has a depth h in a range of approximately 0.001 mm to 0.02 mm. When the first groove 32 has a greater depth, more light may be diffusely reflected at the first groove 32. But when the depth h is greater than approximately 0.02 mm, normal diffusion of light toward a side of the light guide 3 close to the second side plate may be affected.

Referring to FIG. 10, when two or more first grooves 32 are disposed in one first regions 31, a shortest distance L in the first direction X between two adjacent first grooves 32 is in a range of approximately 0.02 mm to 0.08 mm. When the shortest distance between two adjacent first grooves 32 is smaller, the bluish white light may be more easily trapped in the first region 32. But when the shortest distance L is less than approximately 0.02 mm, a fabrication process may be difficult, and when the shortest distance L greater than approximately 0.08 mm, it may be difficult to trap sufficient blueish white light.

The first groove 32 has roughness Sa of approximately 0.858. The roughness of the first groove 32 largely determines directions and amount of the diffuse reflection of the bluish white light. When the roughness Sa is approximately 0.858, the amount of the bluish white light that is diffusely reflected may be the largest, and the bluish white light may be diffusely reflected to many directions. Accordingly, the bluish white light diffusely reflected may be easily mixed with the yellowish white light.

When the depth h of the first grooves 32 is in a range of approximately 0.001 mm to 0.02 mm, or the shortest distance L between two adjacent first grooves 32 is in a range of approximately 0.02 mm and 0.08 mm, or the roughness Sa of the first grooves 32 is approximately 0.858, when light emitted from the light-emitting center portions 22 passes through the first regions 31, diffuse reflection may occur at the first grooves 32. Accordingly, the bluish white light emitted from the light-emitting center portions 22 may be trapped in the first regions 31, and mixed with the yellowish light emitted from the edge portions 23 at two sides of the light-emitting center portions 22. As such, white light with mixed blue light and yellow light may be formed, and thus the problem of before-light visual yellowing may be weakened.

Figure 12:
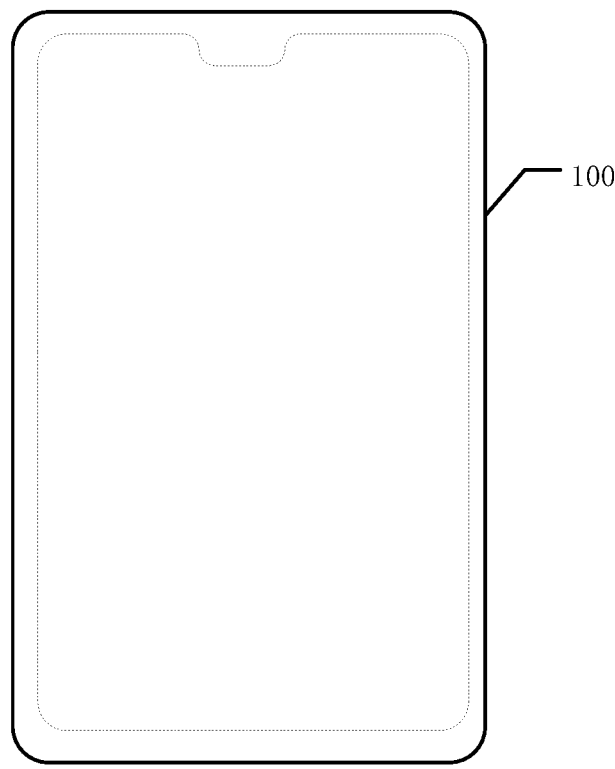
FIG. 12 illustrates a structural schematic of a display device consistent with the disclosed embodiments of the present disclosure.

FIG. 12 illustrates a structural schematic of a display device consistent with the disclosed embodiments of the present disclosure. As shown in FIG. 12, the display device 200 includes a backlight module 100 provided by the present disclosure, and a display panel (not labelled) disposed opposite to the backlight module 100. The display panel is located at a side of a light exiting surface of the backlight module.

As an example, the display device shown in FIG. 12 is a mobile phone. It may be understood that the display device 200 provided by the present invention may be a display device 200 having a display function, such as a computer, a television, an electronic paper, or an in-vehicle display device. The present disclosure does not specifically limit types of the display device. The display device 200 provided by the present disclosure may have beneficial effects of the backlight module 100 provided by the present disclosure. Details of the beneficial effects may be found in descriptions of the backlight modules 100 in the foregoing embodiments, and are not described here again.

As disclosed, the technical solutions of the present disclosure have the following advantages.

In a backlight module provided by the present disclosure, a backlight source includes a plurality of LED lights arranged in a second direction. Each of the LED lights includes a light-emitting center portion, and the light-emitting center portion has a light-exiting side for projecting light in a first direction to a light guide plate. A side of the light guide plate close to the backlight source includes a plurality of first regions. The first regions are in one-to-one correspondence to the light-emitting center portions. An orthographic projection of one first regions on a plane of a bottom plate abuts on an orthographic projection of a corresponding light-emitting center portion on the plane of the bottom plate. In the present disclosure, first grooves arranged in the first direction and extending in the second direction are disposed in the first regions. When light emitted from the light-emitting center portions passes through the first regions, diffuse reflection may occur at the first grooves. As such, bluish white light emitted from the light-emitting center portions may be trapped in the first regions, and mixed with yellowish light emitted from the edge portions at two sides of the light-emitting center portions. Accordingly, white light with mixed blue light and yellow light may be formed, and thus the problem of before-light visual yellowing may be weakened.

The embodiments disclosed herein are exemplary only and not limiting the scope of this disclosure. Various combinations, alternations, modifications, equivalents, or improvements to the technical solutions of the disclosed embodiments can be obvious to those skilled in the art. Without departing from the spirit and scope of this disclosure, such combinations, alternations, modifications, equivalents, or improvements to the disclosed embodiments are intended to be encompassed within the scope of the present disclosure.

What is claimed is:

1. A backlight module, comprising:
a housing including a bottom plate and side plates, the side plates and the bottom plate forming a receiving cavity;
a backlight source received in the receiving cavity, and including a plurality of LED lights each having a light-emitting center portion for projecting light in a first direction; and
a light guide plate received in the receiving cavity, and including a light receiving edge surface facing the backlight source and extending in a second direction, a light-exiting top surface, and a bottom surface,
wherein a plurality of first regions are included on a portion of the bottom surface of the light guide plate close to the light receiving edge surface in one-to-one correspondence to the light-emitting center portion of each LED light of the plurality of LED lights, each of the plurality of first regions having at least one first groove arranged in the first direction and extending in the second direction.

2. The backlight module according to claim 1, wherein in the second direction, a length of the first region is less than or equal to a length of the light-emitting center portion.

3. The backlight module according to claim 1, wherein in a direction perpendicular to a plane of the light guide plate, the at least one first groove has a depth in a range of approximately 0.001 mm to 0.02 mm.

4. The backlight module according to claim 1, wherein, when two or more first grooves are disposed in one first region, a shortest distance in the first direction between two adjacent first grooves is in a range of approximately 0.02 mm to 0.08 mm.

5. The backlight module according to claim 1, wherein the at least one first groove has a roughness value of approximately 0.858.

6. The backlight module according to claim 1, further comprising:
a reflection sheet located on a portion of the bottom surface of the light guide plate;
a first diffusion sheet on the light-exiting top surface of the light guide plate;
a brightness enhancement film on the first diffusion sheet away from the bottom plate; and
a second diffusion sheet on the brightness enhancement film away from the bottom plate.

7. The backlight module according to claim 1, wherein:
the at least one first groove has a first cross section in a direction perpendicular to a plane of the light guide plate; and
the first cross section has a first side in the first direction, and the first side is zigzag-shaped or arc-shaped.

8. The backlight module according to claim 7, wherein:
the side plates include a first side plate, a second side plate, a third side plate and a fourth side plate, wherein the first side plate and the second side plate are located opposite to each other at two sides of the bottom panel in the first direction, and the third side plate and the fourth side plate are located at two opposite sides of the bottom plate in the second direction;
the bottom plate, the first side plate, the second side plate, the third side plate and the fourth side plate form the receiving cavity;
the backlight source is located between the light guide plate and the first side plate; and
an orthographic projection of the at least one first groove on a plane of the third side plate is trapezoidal shaped or triangular shaped.

9. The backlight module according to claim 1, wherein:
the backlight source includes an inter-light portion between two adjacent light-emitting center portions, and in the second direction, each LED light includes edge portions at two sides of the light-emitting center portion, wherein a first interval is located between two adjacent LED lights, and the inter-light portion includes edge portions of two adjacent LED lights and the first interval;
a plurality of second regions is also included on another portion of the bottom surface of the light guide plate close to the light receiving edge surface of the light guide plate, and the plurality of second regions is in one-to-one correspondence to the inter-light portions, wherein an orthographic projection of one second region on the plane of the bottom plate abuts on an orthographic projection of a corresponding inter-light portion on the plane of the bottom plate;
in one second region, at least one second groove is included at a side close to the bottom plate, wherein the at least one second groove is arranged in the first direction and extends in the second direction, and in the second direction, the at least one second groove is located between two adjacent first grooves; and
each of the at least one second groove includes a disconnection portion.

10. The backlight module according to claim 9, wherein in the second direction, the at least one second groove is disposed in parallel with the first grooves.

11. The backlight module according to claim 9, wherein:
each second region includes a second sub-region;
the second sub-region is in one-to-one correspondence with the first interval, wherein an orthographic projection of the second sub-region on the plane of the bottom plate abuts on an orthographic projection of the first interval on the plane of the bottom plate; and
the second sub-region includes at least one disconnection portion.

12. The backlight module according to claim 9, wherein the at least one first groove and the at least one second groove are formed by laser scribing or collision point stacking.

13. A display device, comprising:
a backlight module, comprising:
a housing including a bottom plate and side plates, the side plates and the bottom plate forming a receiving cavity;
a backlight source received in the receiving cavity, and including a plurality of LED lights each having a light-emitting center portion for projecting light in a first direction; and
a light guide plate received in the receiving cavity, and including a light receiving edge surface facing the backlight source and extending in a second direction, a light-exiting top surface, and a bottom surface,
wherein a plurality of first regions are included on a portion of the bottom surface of the light guide plate close to the light receiving edge surface in one-to-one correspondence to the light-emitting center portion of each LED light of the plurality of LED lights, each of the plurality of first regions having at least one first groove arranged in the first direction and extending in the second direction; and a display panel disposed on the light-exiting top surface of the backlight module.

\* \* \* \* \*